United States Patent
Shair et al.

(10) Patent No.: US 9,945,354 B2
(45) Date of Patent: Apr. 17, 2018

(54) SYSTEM AND METHOD FOR CONTROLLING BONDING MATERIAL IN A WIND TURBINE BLADE

(71) Applicant: General Electric Company, Schenectady, NY (US)

(72) Inventors: Sultan Shair, Ismaning (DE); Thomas Merzhaeuser, Munich (DE); Mohammad Salah Attia, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 433 days.

(21) Appl. No.: 14/615,450

(22) Filed: Feb. 6, 2015

(65) Prior Publication Data

US 2016/0115939 A1    Apr. 28, 2016

Related U.S. Application Data (60) Provisional application No. 62/068,784, filed on Oct. 27, 2014.

(51) Int. Cl.
*F03D 11/02* (2006.01)
*F03D 1/06* (2006.01)
(Continued)

(52) U.S. Cl.
CPC .......... *F03D 1/0675* (2013.01); *B29C 65/002* (2013.01); *F03D 13/10* (2016.05);
(Continued)

(58) Field of Classification Search
CPC ...... F03D 13/10; F16B 11/066; Y02E 10/721; Y02E 10/728; Y02P 70/523; B29C 66/14;
(Continued)

(56) References Cited

U.S. PATENT DOCUMENTS 3,586,460 A * 6/1971 Toner ............... B64C 27/473
                                                    416/144
4,643,646 A * 2/1987 Hahn ............... B64C 27/473
                                                    416/226
(Continued)

FOREIGN PATENT DOCUMENTS

EP         2626196 A1    8/2013
WO    2013063760 A1    5/2013
(Continued)

OTHER PUBLICATIONS

European Search Report and Opinion issued in connection with corresponding EP Application No. 15191325.8 dated Mar. 3, 2016.
(Continued)

*Primary Examiner* — Umashankar Venkatesan
(74) *Attorney, Agent, or Firm* — Nitin N. Joshi (57) ABSTRACT

A wind turbine blade includes a first shell member including a first mating surface along a first edge of the wind turbine blade. Also, the wind turbine blade includes a second shell member including a second mating surface along the first edge of the wind turbine blade, wherein the second mating surface is opposite to the first mating surface. Further, the wind turbine blade includes a bonding material disposed between the first mating surface and the second mating surface and configured to bond the first mating surface to the second mating surface. Moreover, the wind turbine blade includes a constrainer positioned at a desired bond line and coupled to one of the first mating surface and the second mating surface, wherein the constrainer is configured to restrict the bonding material from migrating into an interior cavity of the wind turbine blade.

21 Claims, 7 Drawing Sheets

(51) Int. Cl.
  *B29C 65/00* (2006.01)
  *F16B 11/00* (2006.01)
  *F03D 13/10* (2016.01)
  *B29L 31/08* (2006.01)
  *B29C 65/48* (2006.01)

(52) U.S. Cl.
  CPC ............ *F16B 11/006* (2013.01); *B29C 65/48* (2013.01); *B29C 65/4835* (2013.01); *B29C 66/1122* (2013.01); *B29C 66/14* (2013.01); *B29C 66/324* (2013.01); *B29C 66/54* (2013.01); *B29L 2031/08* (2013.01); *B29L 2031/085* (2013.01); *Y02E 10/721* (2013.01); *Y02P 70/523* (2015.11)

(58) Field of Classification Search
  CPC . B29C 66/1122; B29C 65/4835; B29C 65/48; B29C 66/324; B29L 66/1122
  USPC ........................................................ 416/232
  See application file for complete search history.

(56) References Cited

U.S. PATENT DOCUMENTS

| | | | |
|---|---|---|---|
| 7,918,653 B2 | 4/2011 | Standish et al. | |
| 7,988,422 B2 * | 8/2011 | Dixon | F03D 1/0675 29/463 |
| 8,038,407 B2 | 10/2011 | Rao | |
| 8,043,066 B2 | 10/2011 | Sambamurty | |
| 8,047,799 B2 | 11/2011 | Nies | |
| 8,047,800 B2 | 11/2011 | Nies | |
| 8,091,229 B2 | 1/2012 | Deak et al. | |
| 8,105,045 B2 | 1/2012 | Stewart | |
| 8,167,569 B2 | 5/2012 | Livingston | |
| 8,262,364 B2 | 9/2012 | Dixon | |
| 8,297,933 B2 | 10/2012 | Riahi | |
| 8,409,381 B2 | 4/2013 | Ramm et al. | |
| 8,425,196 B2 | 4/2013 | Fritz et al. | |
| 8,426,018 B2 | 4/2013 | Madsen et al. | |
| 8,506,250 B2 | 8/2013 | Bagepalli et al. | |
| 8,807,954 B2 | 8/2014 | Gill | |
| 2007/0098561 A1 | 5/2007 | Rochholz | |
| 2010/0047070 A1 | 2/2010 | Slot et al. | |
| 2011/0200444 A1 | 8/2011 | Garcia | |
| 2013/0108455 A1 * | 5/2013 | Quiring et al. | F03D 1/0675 416/232 |
| 2013/0164141 A1 | 6/2013 | Lin et al. | |
| 2013/0170991 A1 | 7/2013 | Olesen | |
| 2014/0294593 A1 * | 10/2014 | Liu | F03D 1/0675 416/232 |
| 2015/0308402 A1 * | 10/2015 | Nielsen | F03D 1/0675 156/125 |
| 2016/0123298 A1 * | 5/2016 | Caruso et al. | F03D 1/0675 416/233 |
| 2016/0369772 A1 * | 12/2016 | Bendel et al. | F03D 1/0675 416/229 R |

FOREIGN PATENT DOCUMENTS

| | | |
|---|---|---|
| WO | 2014001567 A1 | 1/2014 |
| WO | 2014086703 A1 | 6/2014 |

OTHER PUBLICATIONS

European Search Report issued in connection with corresponding EP Application No. 15191325.8 dated Mar. 3, 2016.

* cited by examiner

SYSTEM AND METHOD FOR CONTROLLING BONDING MATERIAL IN A WIND TURBINE BLADE

CROSS REFERENCE TO RELATED APPLICATIONS

This non-provisional application claims the benefit of priority under 35 U.S.C. § 119(e) to U.S. Provisional Patent Application No. 62/068,784, entitled "SYSTEM AND METHOD FOR FORMING A WIND TURBINE BLADE", filed 27 Oct. 2014, which is herein incorporated in its entirety by reference.

BACKGROUND

Embodiments of the present specification relate generally to wind turbines, and more particularly to a system and method for controlling bonding paste in a wind turbine blade.

Typically, a wind turbine is used to convert wind energy into electrical energy. Particularly, when wind blows across turbine blades of the wind turbine, an airfoil in the turbine blades creates a pressure difference between the sides of the turbine blades. Consequently, a lift force acts on the turbine blades to generate torque on the main rotor shaft. Further, the main rotor shaft is coupled to a generator for producing electricity by using the generated torque.

Turbine blades play an important role in converting the wind energy into mechanical energy, which in turn is used to produce electrical energy. Typically, the turbine blades include an upper shell member and a lower (pressure side) shell member that are bonded together at bond lines along trailing and leading edges of the blade. The bond lines are generally formed by applying a suitable bonding paste or compound along the bond lines between the upper and lower shell members. The bonding paste may be applied within a determined bond width between the upper and lower shell members. However, when bonding the upper shell member with the lower shell member, the bonding paste tends to migrate past the determined bond width and into the interior blade cavity. This excess bonding paste leads to a larger bond width and may incur additional material cost.

BRIEF DESCRIPTION

In accordance with aspects of the present specification, a wind turbine blade is presented. The wind turbine blade includes a first shell member including a first mating surface along a first edge of the wind turbine blade. Also, the wind turbine blade includes a second shell member including a second mating surface along the first edge of the wind turbine blade, wherein the second mating surface is opposite to the first mating surface. Further, the wind turbine blade includes a bonding material disposed between the first mating surface and the second mating surface and configured to bond the first mating surface to the second mating surface. Moreover, the wind turbine blade includes a constrainer positioned at a desired bond line and coupled to one of the first mating surface and the second mating surface, wherein the constrainer is configured to restrict the bonding paste from migrating into an interior cavity of the wind turbine blade.

In accordance with a further aspect of the present specification, a method includes disposing a constrainer between a first shell member and a second shell member of a wind turbine blade. Further, the method includes disposing a bonding material between a first mating surface of the first shell member and a second mating surface of the second shell member. Also, the method includes pressing the second shell member against the first shell member to bond the first mating surface with the second mating surface. In addition, the method includes restricting, by the constrainer, the bonding material from migrating into an interior cavity of the turbine blade.

In accordance with another aspect of the present specification, a wind turbine is presented. The wind turbine includes a tower and a nacelle mounted on top of the tower. Further, the wind turbine includes a rotor hub coupled to one end of the nacelle. Also, the wind turbine includes a plurality of turbine blades coupled to the rotor hub, wherein each of the plurality of turbine blades comprises a first shell member including a first mating surface along a first edge of the wind turbine blade. Further, the wind turbine blade includes a second shell member including a second mating surface along the first edge of the wind turbine blade, wherein the second mating surface is opposite to the first mating surface. Also, the wind turbine blade includes a bonding material disposed between the first mating surface and the second mating surface and configured to bond the first mating surface to the second mating surface. Moreover, the wind turbine blade includes a constrainer positioned at a desired bond line and coupled to one of the first mating surface and the second mating surface, wherein the constrainer is configured to restrict the bonding paste from migrating into an interior cavity of the wind turbine blade.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

As will be described in detail hereinafter, various embodiments of exemplary systems and methods for bonding an upper shell member to a lower shell member of a wind turbine blade are presented. In particular, the systems and methods presented herein aid in restricting bonding paste from migrating into the interior cavity of turbine blades. By employing the methods and the various embodiments of the systems of the present specification, migration of the bonding paste into an interior cavity of the wind turbine blades may be minimized or ceased completely. This in turn improves the bond width control and reduces unnecessary material waste.

Figure 1:
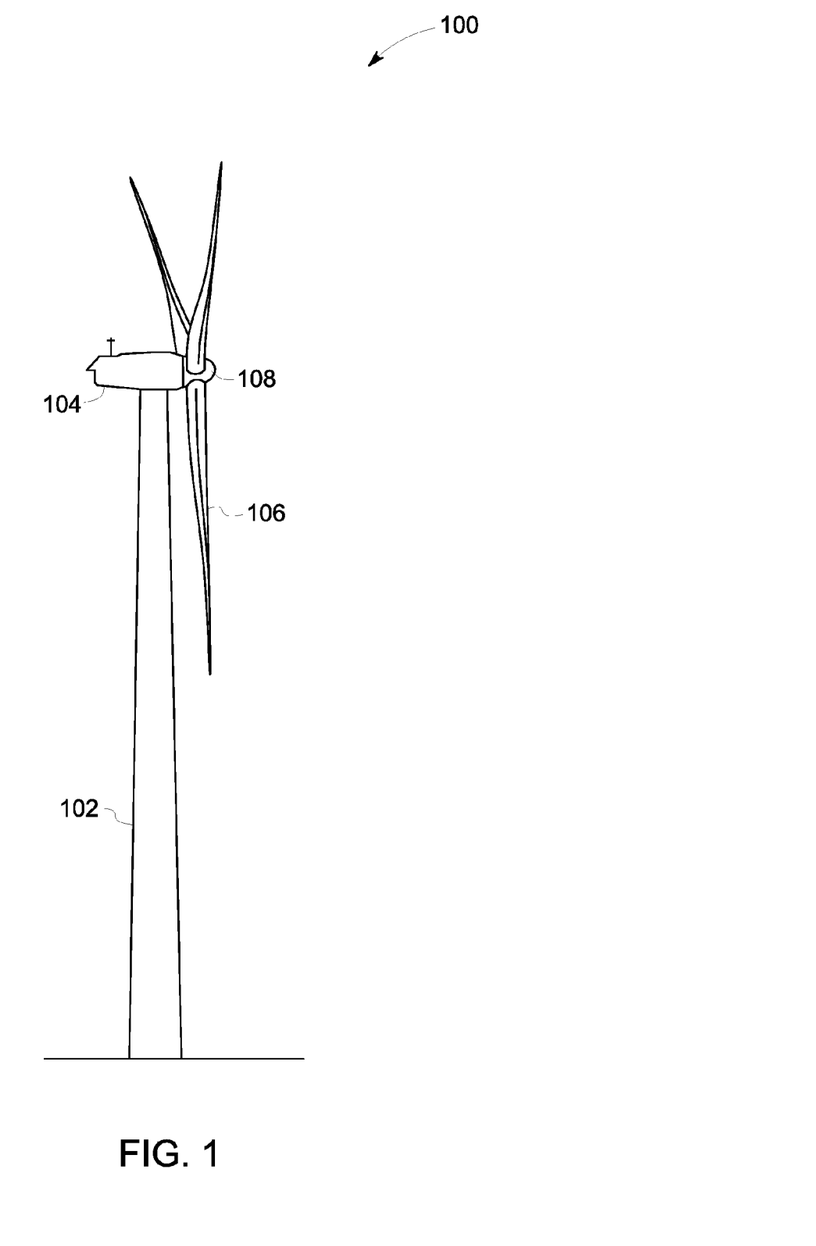
FIG. 1 is a diagrammatical representation of a wind turbine, in accordance with aspects of the present specification.

Turning now to the drawings and referring to FIG. 1, a diagrammatical representation of a wind turbine 100, in accordance with aspects of the present specification, is depicted. The wind turbine 100 is used to covert wind energy into electrical energy. As depicted in FIG. 1, the wind turbine 100 includes a tower 102 with a nacelle 104 mounted thereon. Further, a plurality of turbine blades 106 are mounted to a rotor hub 108, which is in turn connected to a main flange that turns a main rotor shaft (not shown). The wind turbine power generation and control components are housed within the nacelle 104. It may be noted that the wind turbine, as depicted in FIG. 1 is for illustrative purposes, and is not limited to any particular type of wind turbine configuration.

Figure 2:
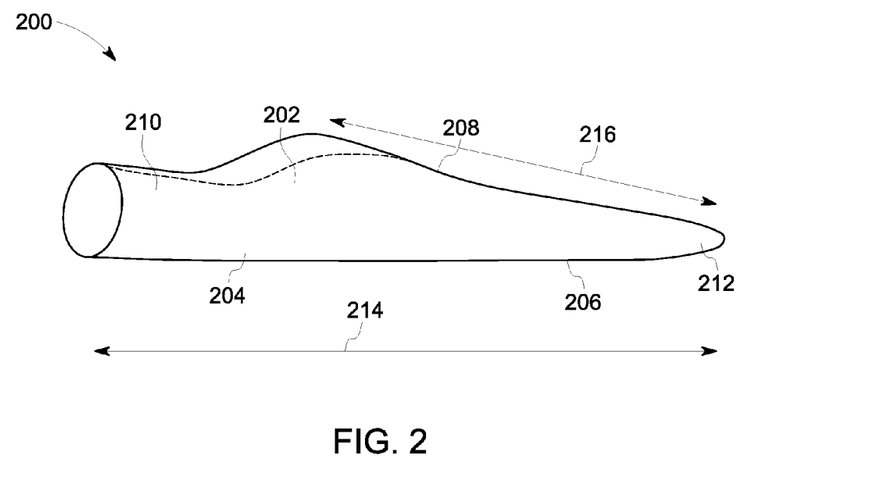
FIG. 2 is a diagrammatical representation of a wind turbine blade, in accordance with aspects of the present specification.
Figure 3:
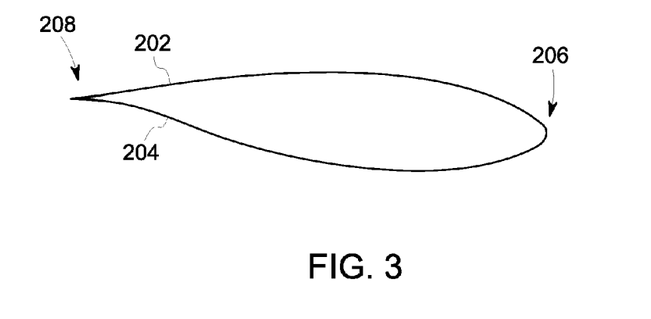
FIG. 3 is a cross-sectional view of the wind turbine blade, in accordance with aspects of the present specification.

Referring to FIG. 2, a diagrammatical representation 200 of one of the turbine blades 106 of FIG. 1 is depicted. Also, FIG. 3 is a cross-sectional view of the turbine blade 200 of FIG. 2. It may be noted that the terms "turbine blade" and "blade" may be used interchangeably. The turbine blade 200 plays a key role in converting wind energy into mechanical energy. The mechanical energy in turn is used to generate electrical energy. Particularly, the turbine blade 200 includes a cross-sectional profile of an airfoil that aids in producing a pressure difference between sides of the turbine blade 200 when air flows over the turbine blade 200. Consequently, a lift force, which is directed from a pressure side surface of the blade 200 towards a suction side surface of the blade 200, may act on the blade 200. This lift force generates torque on the main rotor shaft, which is coupled to a generator (not shown). Further, the generator produces electrical energy using the torque generated on the main rotor shaft.

As depicted in FIGS. 2 and 3, the blade 200 includes an upper shell member 202 and a lower shell member 204. The upper shell member 202 may be configured as the suction side surface of the blade 200, while the lower shell member 204 may be configured as the pressure side surface of the blade 200. It may be noted that the terms "lower shell member" and "first shell member" may be used interchangeably. Similarly, the terms "upper shell member" and "second shell member" may be used interchangeably.

Further, the blade 200 includes a leading edge 206 and a trailing edge 208. In addition, the blade 200 includes a root portion 210 and a tip portion 212. The upper shell member 202 and the lower shell member 204 are typically joined together at a bond line 214 along the leading edge 206 and at a bond line 216 along the trailing edge 208 to form the blade 200. The aspect of coupling or bonding the upper shell member 202 and the lower shell member 204 is described in greater detail with reference to FIG. 4.

Figure 4:
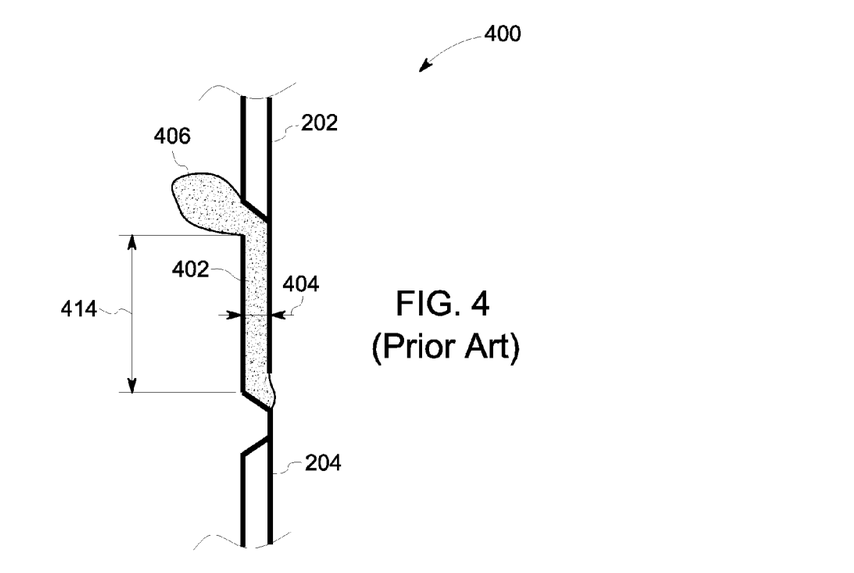
FIG. 4 is a diagrammatical representation of a portion of a leading edge of the wind turbine blade.

Referring to FIG. 4, a portion 400 of the leading edge 206 of the turbine blade 200 of FIGS. 2 and 3, in accordance with aspects of the present specification, is depicted. For ease of understanding, FIG. 4 is described with reference to the components of FIGS. 2 and 3. The leading edge 206 is formed by bonding an upper shell member 202 with a lower shell member 204 of the turbine blade 200. Particularly, a bonding paste 402 in a flowable viscous form may be applied between mating laminate surfaces of the upper shell member 202 and the lower shell member 204 along the length of the bond line 214. It should be appreciated that the term "bonding paste" is used herein in a generic sense to encompass any type of adhesive or bonding material in an initially flowable state and is employed to bond the upper and lower shell members. Any suitable type of epoxy, compound, or other material may be used as the bonding paste. Also, it may be noted that the terms "bonding paste" and "bonding material" may be used interchangeably.

Further, the bonding paste 402 is typically applied in a sufficient quantity based on a determined pattern at the leading edge 206. Further, a minimum surface area between the components along the length of the respective bond line 214 is ensured. For example, the bonding paste 402 may be applied between opposite mating laminate surfaces of the upper shell member 202 and the lower shell member 204 to achieve the desired final bond width 414 and bond thickness 404 upon the mating of both shells. The design criteria for the bond width 414 and thickness 404 may vary based on different types of blades. In addition, one or more design factors may affect/influence the bond width and/or the thickness.

In a conventional system, when the mating surfaces of the upper shell member 202 and the lower shell member 204 are pressed against each other, excess bonding paste 406 may squeeze into the blade 200 from the mating surfaces of the upper and lower shell members 202, 204. This excess bonding paste 406 may migrate into an interior cavity of the blade 200. Furthermore, the excess bonding paste 406 may cure as a hardened mass. The term "interior cavity" is referred to as an empty space within the turbine blade. In one example, the interior cavity may be formed when the upper and lower shell members 202, 204 are operatively coupled to each other.

In a similar manner, the bonding paste may be applied at the trailing edge 208 (not shown) of the blade 200 along the bond line 216. Here again, when the mating surfaces of the upper shell member 202 and the lower shell member 204 are pressed against each other at the trailing edge 208, excess bonding paste may migrate into the blade, past the desired bond width, from the mating surfaces of the upper and lower shell members 202, 204, and may cure as a hardened mass, thereby leading to a larger bond width. Moreover, the excess bonding paste at the leading edge 206 and the trailing edge 208 may incur additional material cost.

Figure 5:
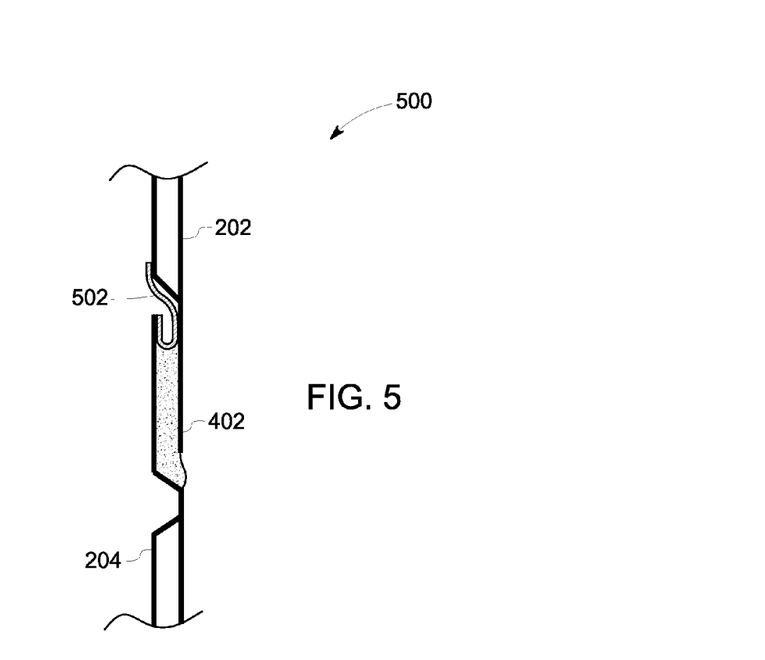
FIG. 5 is a diagrammatical representation of a portion of a leading edge of the wind turbine blade having a constrainer, in accordance with aspects of the present specification.

In accordance with exemplary aspects of the present specification, the problems with the currently available techniques may be circumvented via use of a constrainer. More particularly, an exemplary system 500 for controlling flow of a bonding material, in accordance with aspects of the present specification, is depicted. FIG. 5 is described with respect to components of FIGS. 2-3. As depicted in FIG. 5, a constrainer 502 may be positioned within the interior cavity of the blade 200 between the upper and lower shell members 202, 204 of the turbine blade 200. In one embodiment, the constrainer 502 may be coupled to the upper shell member 202 or the lower shell member 204 of the turbine blade 200. The constrainer 502 may be used to restrict any excess bonding paste from migrating into the interior cavity when the upper shell and lower shell members 202, 204 are operatively coupled with each other to form the bond lines. The aspect of positioning the constrainer 502 in the turbine blade 200 to restrict the flow of any excess bonding paste into the interior cavity of the turbine blade is described in greater detail with reference to the trailing edge of the turbine blade depicted in FIGS. 6-8.

Figure 6:
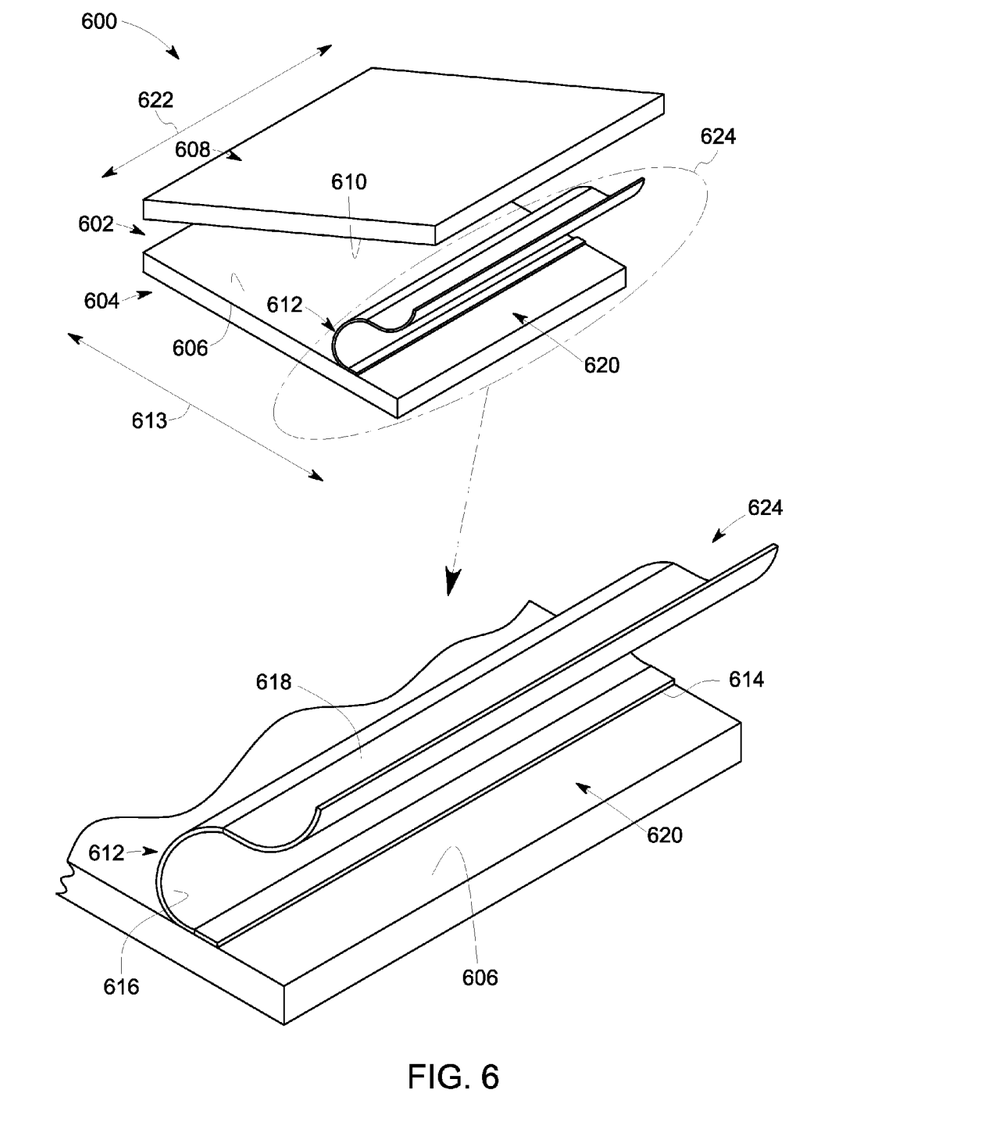
FIGS. 6-8 illustrate a portion of a trailing edge at various stages of bonding an upper shell member to a lower shell member of the wind turbine blade, in accordance with aspects of the present specification.
Figure 7:
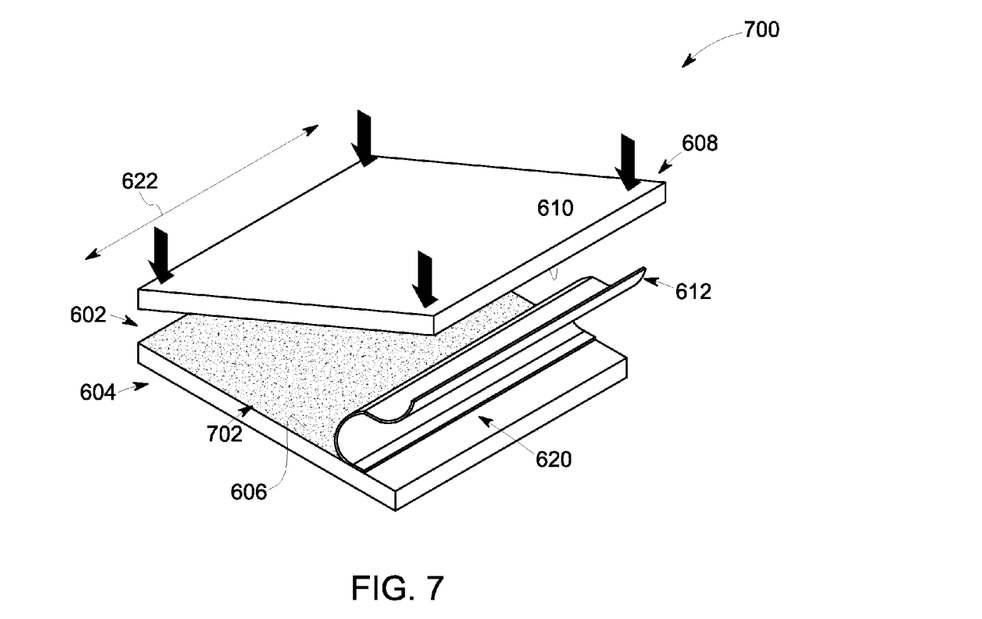
Figure 8:
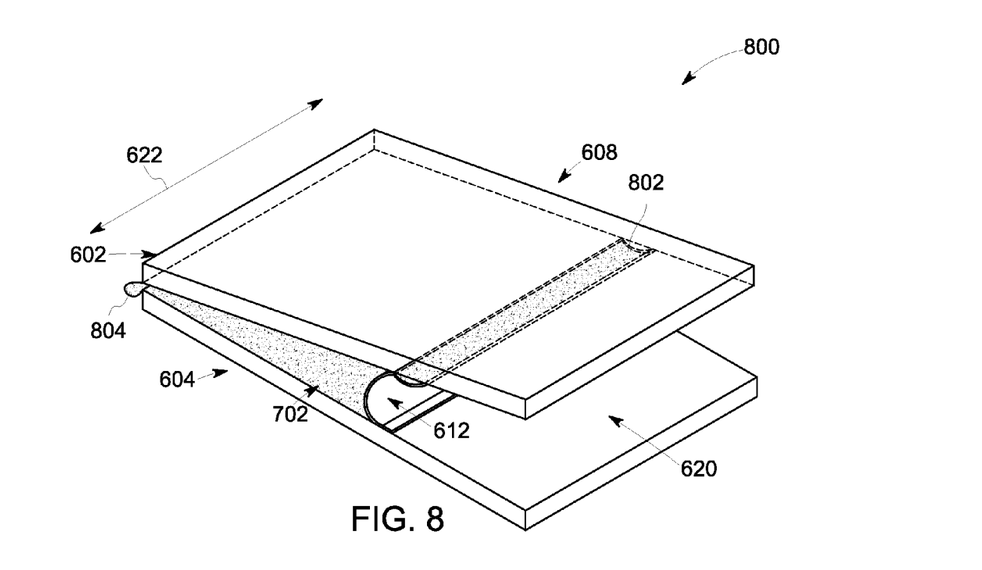

Referring to FIGS. 6-8, isometric views of a portion of a turbine blade 600 at various stages of bonding the shell members of the turbine blade 600 are depicted. The depicted portion of the turbine blade 600 may include a trailing edge or a first edge 602 of the turbine blade 600. It may be noted that the terms "trailing edge" and "first edge" may be used interchangeably.

As depicted in FIG. 6, a lower shell member 604 includes a first mating surface 606 along the first edge 602 of the turbine blade 600. Similarly, an upper shell member 608 includes a second mating surface 610 along the first edge 602 of the turbine blade 600. The first mating surface 606 of the lower shell member 604 is disposed horizontally, while the second mating surface 610 of the upper shell member 608 is inclined at a determined angle and positioned at a determined height from the lower shell member 604. It may be noted that the first and second mating surfaces 606, 610 may be disposed in any position, and is not limited to the position depicted in FIG. 6. Reference numeral 620 is a general representation of an interior cavity of the turbine blade 600. Also, reference numeral 622 is a representation of a desired bond line. Moreover, a desired bond with is represented by reference numeral 613.

Moreover, in accordance with exemplary aspects of the present specification, a constrainer 612 may be positioned between the upper and lower shell members 608, 604. In particular, the constrainer 612 may be coupled to the lower shell member 604 of the turbine blade 600. It may be noted that an enlarged view of a portion 624 of the turbine blade 600 having the constrainer 612 is depicted in FIG. 6. In one embodiment, the constrainer 612 includes a base section 614, a curved section 616, and a collector section 618. It may be noted that the constrainer 612 may have various other geometries, and is not limited to the geometry shown in FIG. 6. Also, it may be noted that the base section 614, the curved section 616, and the collector section 618 may be of any desired shape, size, thickness, and/or length. Further, the base section 614 of the constrainer 612 may be coupled to the first mating surface 606 of the lower shell member 604, while the curved section 616 may be coupled vertically to the base section 614, as depicted in FIG. 6. In one embodiment, the base section 614 of the constrainer 612 may be coupled to the first mating surface 606 of the lower shell member 604 or coupled to the second mating surface 610 of the upper shell member 608. The curved section 616 may be a convex shaped section or a concave shaped section (see FIGS. 9-10). In one example, the base section 614 of the constrainer 612 may be coupled to the first mating surface 606 of the lower shell member 604 by using a bonding paste or any other adhesive material. It may be noted that the base section 614 may also be coupled to the first mating surface 606 by using other fastening means. Also, as depicted in FIG. 6, the collector section 618 may be coupled to the end of the curved section 616 facing the interior cavity 620 of the turbine blade 600. In one example, the collector section 618 may be an extension of the curved section 616 that is bent to form a U-shape structure facing the interior cavity 620 of the turbine blade 600. It may be noted that in certain embodiments, the base section 614, the curved section 616, and the collector section 618 may be integrated or embedded as a single component. Additionally, in one embodiment, the constrainer 612 may be positioned at the desired bond line 622 to separate the interior cavity 620 of turbine blade 600 from the mating surfaces 606, 610 of the upper and lower shell members 608, 604. The constrainer 612 may also be positioned along the desired bond line 622 and at the desired bond width 613. In one example, the desired bond line 622 may be representative of the bond line 216 (see FIG. 2) of the turbine blade 200.

Further, a diagrammatical representation 700 of another step of bonding the shell members of the turbine blade is depicted in FIG. 7. A bonding paste 702 may be disposed on the first mating surface 606 along the desired bond line 622 of the first edge 602 of the turbine blade 600. The bonding paste 702 may be applied to a predetermined area of the first mating surface 606. In one embodiment, the bonding paste 702 may be applied in a sufficient quantity based on a determined pattern along the desired bond line 622 of the turbine blade 600. In one embodiment, the curved section 616 of the constrainer 612 may act as a wall separating the bonding paste 702 from the interior cavity 620 of the turbine blade 600.

Upon applying the bonding paste 702, the second mating surface 610 of the upper shell member 608 may be brought in close proximity with an upper surface of the bonding paste 702, as depicted in diagrammatical representation 800 of yet another step of forming the bond line in FIG. 8. Thereafter, pressure may be applied to the upper shell member 608 to bring the upper shell member 608 in contact with the lower shell member 604 and to bond the second mating surface 610 of the upper shell member 608 with the first mating surface 606 of the lower shell member 604 along the first bond line 622.

When pressure is applied on the upper shell member 608, any excess bonding paste may be forced against the constrainer 612 and may move towards the first edge 602 of the turbine blade 600. Particularly, the constrainer 612 may be configured to restrict the bonding paste 702 from migrating into the interior cavity 620 of the turbine blade 600. Moreover, when the constrainer 612 restricts movement or flow of the bonding paste, a portion 804 of the bonding paste 702 may be forced out of the turbine blade 600 at the first edge 602 of the turbine blade 600, as depicted in FIG. 8. This portion 804 of the bonding paste may be referred to as a first portion of the bonding paste. Further, the first portion 804 of the bonding paste 702 may be removed from the turbine blade 600.

In one embodiment, when the constrainer 612 restricts the movement or flow of the bonding paste 702, a small portion 802 of the bonding paste 702 may escape from the end of the curved section 616 of the constrainer 612, as depicted in FIG. 8. This small portion 802 may be referred to as a second portion of the bonding paste 702. However, the collector section 618 of the constrainer 612 that is attached to the end of the curved section 616 may be configured to collect the second portion 802 of the bonding paste 702. As a result, movement or flow of the second portion 802 of the bonding paste 702 is restricted from reaching the interior cavity 620 of the blade 600, thereby preventing the portion 802 of the bonding paste from settling as a hardened mass in the interior cavity 620 of the blade 600.

Thus, by employing the exemplary constrainer 612, the excess bonding paste is restricted from migrating into the interior cavity 620 of the turbine blade 600. Also, the first portion 804 of the excess bonding paste may be easily removed from the turbine blade 600.

Figure 9:
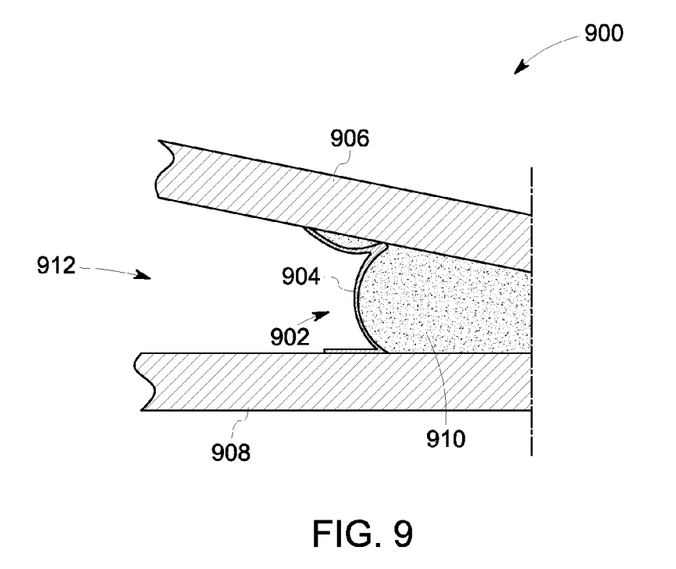
FIGS. 9-10 illustrate a portion of a trailing edge with different embodiments of a constrainer employed in the wind turbine blade, in accordance with aspects of the present specification.

Referring to FIG. 9, a side view 900 of a portion of a trailing edge of a wind turbine blade is depicted. Particularly, FIG. 9 depicts a side view of a constrainer that is positioned between first and second mating surfaces of upper and lower shell members 906, 908 of the wind turbine blade 900. A constrainer 902 having a convex shape is employed to restrict bonding paste 910 from migrating into an interior cavity 912 of the wind turbine blade 900. Particularly, a curved section 904 of the constrainer 902 has a convex shape, and hence a convex front-line surface of the bonding paste 910 is formed or defined at a side facing the interior cavity 912 of the turbine blade 900. In one embodiment, the constrainer 902 may include a flexible material that may be compressed into one or more shapes. In the embodiment of FIG. 9, the curved section 904 having the flexible material may be compressed from its original shape to form a convex shape when the upper shell member 906 is pressed against the lower shell member 908. In one embodiment, the flexible material may include fiber reinforced plastics, such as glass fibers reinforced plastic and carbon fiber reinforced plastic. In another embodiment, the flexible material may include foams, commercial plastic, and/or any other similar plastics.

Figure 10:
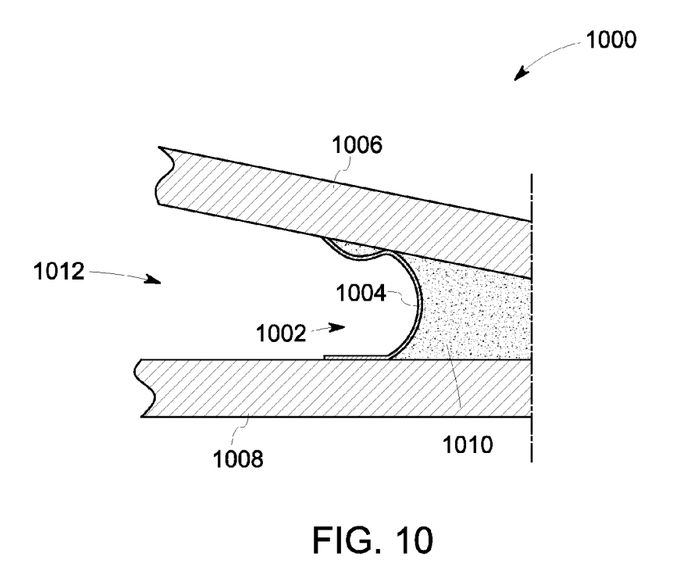

In a similar manner, FIG. 10 depicts a side view 1000 of a portion of a trailing edge of a wind turbine blade, in accordance with another embodiment of the present disclosure. Particularly, FIG. 10 depicts a side view of a constrainer 1002 that is positioned between first and second mating surfaces of upper and lower shell members 1006, 1008 of the wind turbine blade 1000. The constrainer 1002 having a concave shape is employed to restrict bonding paste 1010 from migrating into an interior cavity 1012 of wind turbine blade 1000. Particularly, a curved section 1004 of the constrainer 1002 has a concave shape, and hence a concave front-line surface of the bonding paste 1010 is formed or defined at a side facing the interior cavity 1012 of the turbine blade 1000. In one embodiment, the constrainer 1002 may include a flexible material that may be compressed into a desired/determined shape. Particularly, the curved section 1004 having the flexible material may be compressed from its original shape to form a concave shape when the upper shell member 1006 is pressed against the lower shell member 1008. In another embodiment, the constrainer 1002, and particularly the curved section 1004, may be transformed into any determined shape when the upper shell member 1006 is pressed against the lower shell member 1008.

Figure 11:
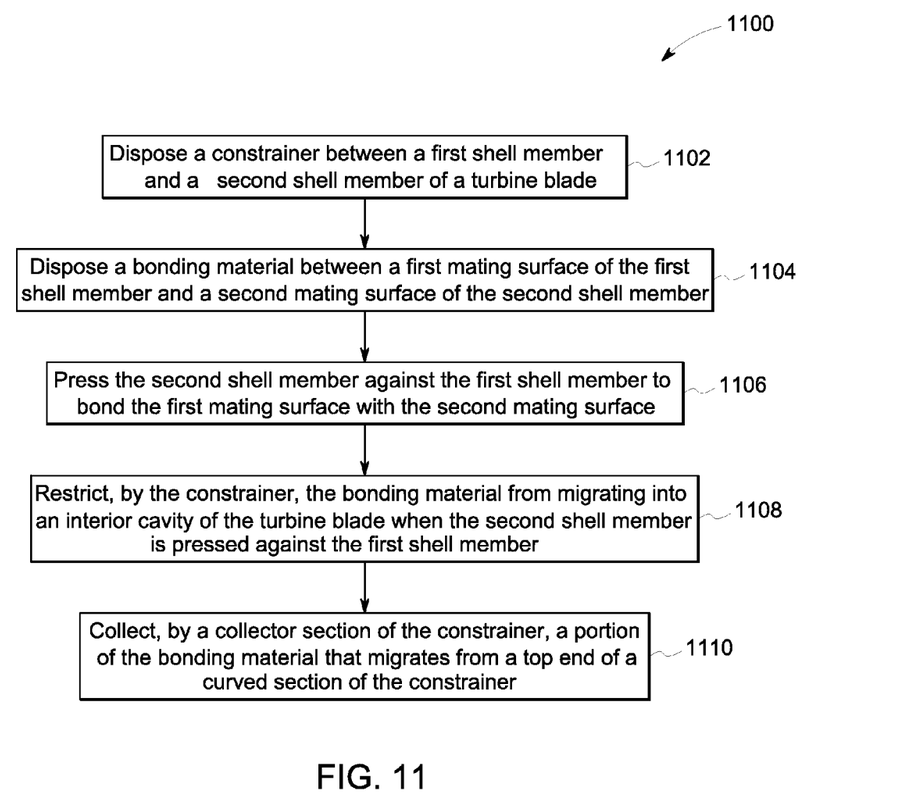
FIG. 11 is a flow chart illustrating a method for bonding the upper shell member to the lower shell member of the wind turbine blade, in accordance with aspects of the present specification.

Referring now to FIG. 11, a flow chart 1100 illustrating a method for joining mating surfaces of a turbine blade, in accordance with aspects of the present specification, is depicted. Moreover, the method aids in restricting a bonding paste from migrating into an interior cavity of the turbine blade. For ease of understanding, the method is described with reference to the components of FIGS. 2-8. The method begins at step 1102, where a constrainer 612 is disposed between a lower shell member 604 and an upper shell member 608 of a turbine blade. Particularly, the constrainer 612 includes a base section 614, a curved section 616, and a collector section 618. The base section 614 of the constrainer 612 may be coupled to the first mating surface 606 of the lower shell member 604, while the curved section 616 may be coupled vertically to the base section 614. Further, the collector section 618 may be coupled to a top end of the curved section 616 facing the interior cavity 620 of the turbine blade 600, as depicted in FIG. 6.

Subsequently, at step 1104, a bonding paste 702 is disposed between a first mating surface 606 of the lower shell member 604 and a second mating surface 610 of the upper shell member 608. Particularly, the bonding paste 702 may be applied over a determined area of the first mating surface 606 along a first edge 602 of the turbine blade 600. In one example, the first edge 602 is the trailing edge of the turbine blade 600.

Furthermore, at step 1106, the upper shell member 608 may be pressed against the lower shell member 604 to bond the first mating surface 606 with the second mating surface 610. More specifically, the second mating surface 610 is brought in close proximity to the first mating surface 606. In one example, the second mating surface 610 may be positioned over the bonding paste 702 that is applied on the first mating surface 606. Further, the upper shell member 608 may be pressed against the lower shell member 604 such that the first mating surface 606 is bonded to the second mating surface 610. In one embodiment, one or more pressing devices may be employed to press the upper shell member 608 against the lower shell member 604. In one example, hydraulic molds may be used to lower the upper shell member 608 onto the lower shell member 604.

Subsequently, at step 1108, the bonding paste 702 may be restricted from migrating into an interior cavity 620 of the turbine blade 600 when the upper shell member 608 is pressed against the lower shell member 604. Particularly, when the upper shell member 610 is pressed against the lower shell member 606, the bonding paste 702 may be forced against the constrainer 612 and may move towards the first edge 602 of the turbine blade 600. In one embodiment, when the upper shell member 608 is pressed against the lower shell member 604, a first portion 804 of the bonding paste 702 may be forced out of the turbine blade 600 at the first edge 602 of the turbine blade 600. This first portion of the bonding paste 804 may be removed from the turbine blade 600.

In addition, at step 1110, a second portion 802 of the bonding paste is collected by the collector section 618 of the constrainer 612. When the upper shell member 610 is pressed against the lower shell member 606, the second portion 802 of the bonding paste 702 may migrate from the end of a curved section 616 of the constrainer 612 towards the interior cavity 620 of the turbine blade. However, this second portion 802 of the bonding paste 702 may be collected by the collector section 618 that is coupled to the top end of the curved section 616 facing the interior cavity 620 of the turbine blade 600. As a result, this second portion 802 of the bonding paste 702 may be restricted from reaching the interior cavity 620 of the turbine blade 600.

The various embodiments of the exemplary system and method aid in restricting the bonding paste from migrating into the interior cavity of the turbine blade. This in turn prevents adding additional weight to the turbine blade, improves blade efficiency and overall performance of the wind turbine, saves material costs and guarantees bond width control. Also, controlling the amount of bonding paste improves the repeatability of the manufacturing process.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:
1. A wind turbine blade, comprising:
   a first shell member comprising a first mating surface along a first edge of the wind turbine blade;
   a second shell member comprising a second mating surface along the first edge of the wind turbine blade, wherein the second mating surface is opposite to the first mating surface;

a bonding material disposed between the first mating surface and the second mating surface and configured to bond the first mating surface to the second mating surface; and a constrainer positioned at a desired bond line and coupled to one of the first mating surface and the second mating surface, wherein the constrainer is configured to restrict the bonding material from migrating into an interior cavity of the wind turbine blade, and wherein the constrainer comprises a base section operatively coupled to the first shell member at one end of the first mating surface and configured to position the constrainer on the first mating surface.

2. The wind turbine blade of claim 1, wherein the constrainer comprises:

a curved section extending vertically from the base section and facing the bonding material disposed between the first mating surface and the second mating surface.

3. The wind turbine blade of claim 2, wherein the curved section of the constrainer is configured to force a first portion of the bonding material out of the wind turbine blade.

4. The wind turbine blade of claim 2, wherein the curved section is configured to define one of a concave front line surface and a convex front line surface of the bonding material.

5. The wind turbine blade of claim 2, wherein the constrainer further comprises a collector section coupled to an end of the curved section facing the interior cavity of the wind turbine blade.

6. The wind turbine blade of claim 5, wherein the collector section is configured to collect a second portion of the bonding material that migrates from the end of the curved section.

7. The wind turbine blade of claim 1, wherein the bonding material is disposed within a determined area between the first mating surface and the second mating surface.

8. The wind turbine blade of claim 7, wherein the constrainer is configured to contain the bonding material within the determined area.

9. The wind turbine blade of claim 1, wherein the constrainer comprises a flexible material configured to restrict the bonding material from migrating into the interior cavity of the turbine blade, and wherein the flexible member is configured to transform into a determined shape when the second shell member is pressed against the first shell member.

10. The wind turbine blade of claim 9, wherein the flexible material comprises fiber reinforced plastic.

11. The wind turbine blade of claim 1, wherein the bonding material is configured to couple the second shell member to the first shell member at the desired bond line along the first edge of the wind turbine blade.

12. The wind turbine blade of claim 1, wherein the first edge of the wind turbine blade comprises one of a leading edge and a trailing edge of the wind turbine blade.

13. A method, comprising:

disposing a constrainer between a first shell member and a second shell member of a wind turbine blade, wherein the constrainer comprises a base section operatively coupled to the first shell member at one end of a first mating surface of the first shell member and configured to position the constrainer on the first mating surface;

disposing a bonding material between the first mating surface of the first shell member and a second mating surface of the second shell member;

pressing the second shell member against the first shell member to bond the first mating surface with the second mating surface; and restricting, by the constrainer, the bonding material from migrating into an interior cavity of the wind turbine blade.

14. The method of claim 13, wherein restricting the bonding material comprises forcing out a first portion of the bonding material at a first edge of the wind turbine blade when the second shell member is pressed against the first shell member.

15. The method of claim 14, wherein the first edge of the wind turbine blade comprises one of a leading edge and a trailing edge of the wind turbine blade.

16. The method of claim 13, further comprising collecting, by a collector section of the constrainer, a second portion of the bonding material that migrates from an end of a curved section of the constrainer when the second shell member is pressed against the first shell member.

17. The method of claim 13, wherein restricting the bonding material comprises positioning the constrainer between the first mating surface and the second mating surface to define one of a concave front line surface and a convex front line surface of the bonding material.

18. The method of claim 17, wherein disposing the constrainer comprises positioning the constrainer between the first mating surface and the second mating surface before pressing the second shell member against the first shell member.

19. The method of claim 13, wherein pressing the second shell member against the first shell member comprises operatively coupling the second shell member with the first shell member along a desired bond line of the wind turbine blade.

20. The method of claim 13, wherein restricting the bonding material comprises compressing the constrainer from an original curved shape of the constrainer to restrict the bonding material from migrating into the interior cavity of the turbine blade, when the second shell member is pressed against the first shell member.

21. A wind turbine, comprising:

a tower;

a nacelle mounted on top of the tower;

a rotor hub coupled to one end of the nacelle;

a plurality of turbine blades coupled to the rotor hub, wherein each of the plurality of turbine blades comprises:

a first shell member comprising a first mating surface along a first edge of the wind turbine blade;

a second shell member comprising a second mating surface along the first edge of the wind turbine blade, wherein the second mating surface is opposite to the first mating surface;

a bonding material disposed between the first mating surface and the second mating surface and configured to bond the first mating surface to the second mating surface; and a constrainer positioned at a desired bond line and coupled to one of the first mating surface and the second mating surface, wherein the constrainer is configured to restrict the bonding material from migrating into an interior cavity of the wind turbine blade, and wherein the constrainer comprises a base section operatively coupled to the first shell member at one end of the first mating surface and configured to position the constrainer on the first mating surface.

* * * * *